(No Model.)  R. H. ELLIOTT.  2 Sheets—Sheet 2.
COMBINED AUGER AND REAMER FOR MINING PURPOSES.
No. 564,508.  Patented July 21, 1896.
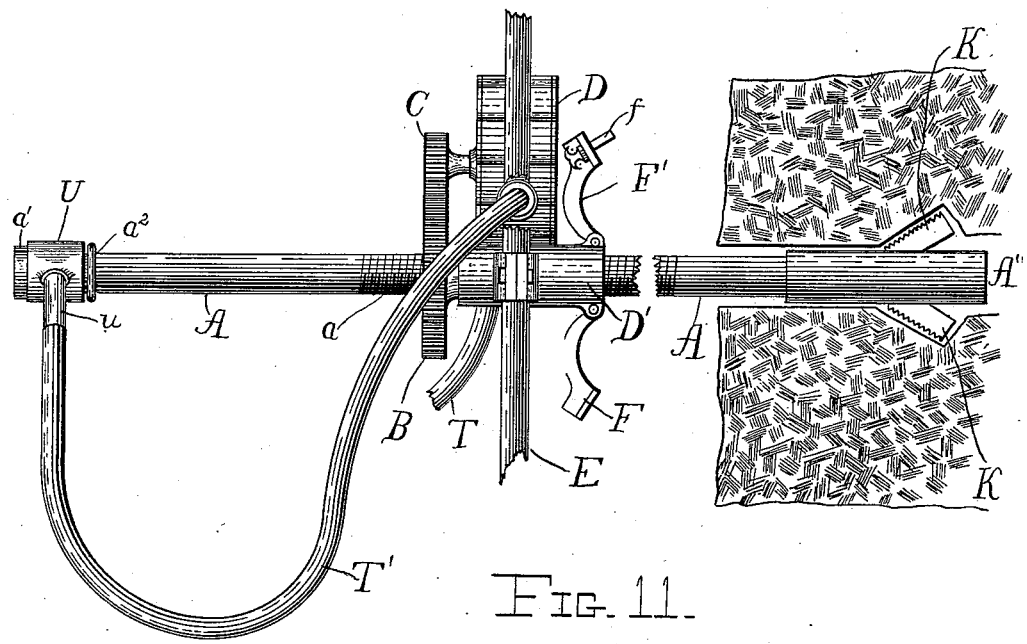
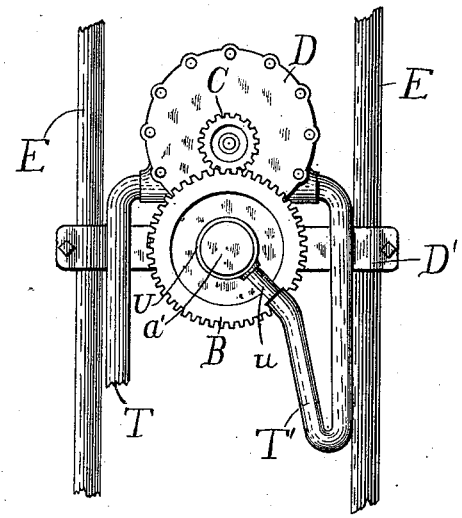

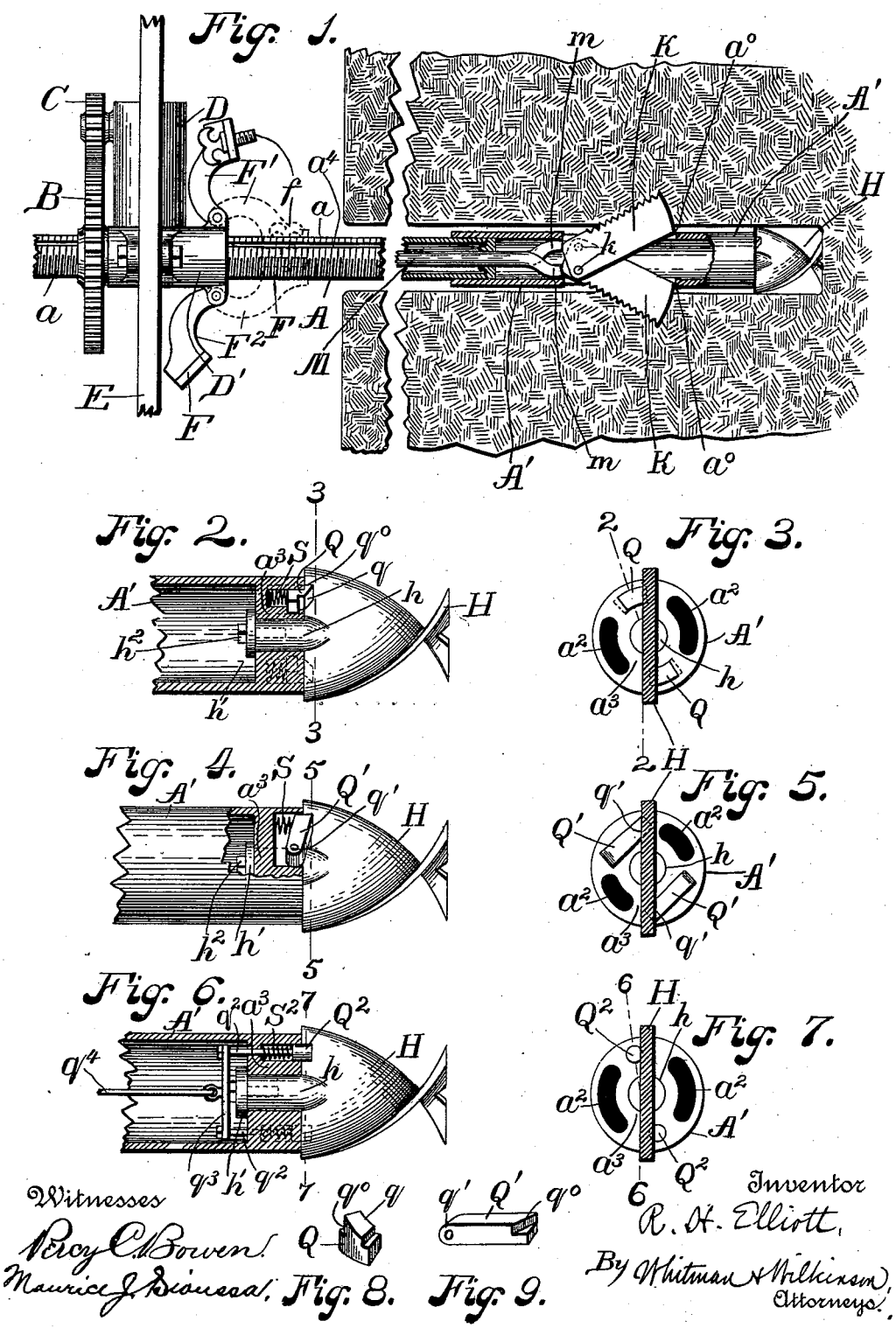

UNITED STATES PATENT OFFICE.

ROBERT H. ELLIOTT, OF BIRMINGHAM, ALABAMA, ASSIGNOR TO THE ALABAMA BLASTING AND MINING COMPANY, OF SAME PLACE.

COMBINED AUGER AND REAMER FOR MINING PURPOSES.

SPECIFICATION forming part of Letters Patent No. 564,508, dated July 21, 1896.

Application filed June 15, 1895. Serial No. 552,949. (No model.)

*To all whom it may concern:*

Be it known that I, ROBERT H. ELLIOTT, a citizen of the United States, residing at Birmingham, in the county of Jefferson and State of Alabama, have invented certain new and useful Improvements in a Combined Auger and Reamer for Mining Purposes; and I do hereby declare the following to be a full, clear, and exact description of the invention, such as will enable others skilled in the art to which it appertains to make and use the same.

My invention relates to improvements in machines for use in mining coal and other like minerals; and it consists in providing a combined reamer and auger which may be used either as a reamer or as an auger, as may be preferred, and in providing means for blowing or washing the chips or cuttings from the bore-hole by means of an air-blast or a jet of water or other fluid.

The said invention will be understood by reference to the accompanying drawings, in which the same parts are indicated by the same letters throughout the several views.

Figure 1 represents a section through the bore-hole, parts of the machine being broken away, and shows the machine with the reaming-blades extended and after the feed-nut has been detached. Fig. 2 represents a detail view of the end of the drill-spindle, part being shown in section along the line 2 2 of Fig. 3. Fig. 3 represents a section along the line 3 3 of Fig. 2 and looking to the left. Fig. 4 represents a detail view of the modified form of ratchet-and-pawl arrangement for preventing the auger from revolving when the drill-spindle is turned in the opposite direction. Fig. 5 represents a section along the line 5 5 of Fig. 4 and looking to the left. Fig. 6 represents a similar view to Fig. 2 and shows a modification in which the auger is attached to the head of the drill-spindle by spring-plungers, which may be drawn to the rear and out of engagement with the auger. Fig. 7 represents a section along the line 7 7 of Fig. 6 and looking to the left. Fig. 8 represents a detail view of one of the spring-operated pawls shown in Figs. 2 and 3, and Fig. 9 represents a detail view of one of the spring-operated pawls shown in Figs. 4 and 5. Fig. 10 represents the side elevation of the combined auger and reamer in use in the mine and shows the lead of the hose or pipes for compressed air. Fig. 11 represents the rear view of the device shown in Fig. 10.

A represents the drill-spindle, which is screw-threaded, as at $a$, and is provided with a longitudinal groove $a^4$, in which a feather of the gear-wheel B engages. This gear-wheel is driven by the pinion C, which is rotated by the engine D, connected by the frame or casting D' to the jack-post E.

An air-engine is preferred, so that the exhaust-air therefrom may be used to blow through the hollow drill-spindle and blow out the chips, as has been described with reference to the structure shown in the Patent No. 530,512, granted December 11, 1894, to R. H. Elliott and J. B. Carrington.

The threads on the drill-spindle engage in a feed-nut F, which is made of two parts mounted on the ends of the arms F' and F², pivoted at their inner ends to the frame D' and clamped together at their outer ends by means of the clamp-screws $f$. When these two arms are clamped together, as shown in dotted lines in Fig. 1, the drill-spindle will feed forward or backward according to the direction of the revolution of the gear-wheel B; but when the two arms are opened out, as shown in full lines in Fig. 1, the tendency to feed forward or backward will be done away with, except that which is due to the action of the cutting apparatus on the drill-head A'. This drill-head A' is rigidly attached to the drill-spindle A in any convenient way and like the drill-spindle is hollow, but is provided with lateral openings $a^0$ to permit the movement therethrough of the reamer-blades and with end openings $a^2$ to permit the flow of air through these end openings around the auger-blade, whence it flows back through the bore-hole, carrying with it the chips or cuttings.

The auger H, which may be of any desired type, is mounted on a spindle $h$, held by the washer $h'$ and tap-bolt $h^2$ to the end $a^3$ of the drill-head A', and the auger is free to revolve about said drill-head, except for the action of the pawls or plungers, which will now be described.

In the device shown in Figs. 2, 3, and 8, Q represents a spring-operated pawl having an inclined face $q$ and a holding-face $q^0$, which pawl fits in a recess in the end of the drill-head and is pressed forward by a spring S, also mounted in the same recess. As the auger is bored into the coal or other mineral the holding-face $q^0$ prevents the revolution of the auger relative to the drill-head and causes the two to rotate together; but when the rotation of the drill-spindle is reversed the auger pushes back the wedge-faces $q$ and allows the drill-spindle to revolve without rotating the auger.

In the form of device shown in Figs. 4, 5, and 9, the pawl Q' is pivoted at $q'$ to the drill-head and is provided with a holding-face $q^0$, so that the auger is forced to revolve with the drill-spindle when turned in one direction, but is released from engagement therewith by this pawl, or the pair of pawls, when the drill-spindle is turned in the opposite direction.

In Figs. 6 and 7 spring-plungers $Q^2$, pressed forward by the springs $S^2$, are shown as the equivalents of the spring-operated pawls already described. The spring-plungers are mounted on the ends of rods $q^2$, connected by the yoke-piece $q^3$ to the rod $q^4$, which passes to the rear and may be drawn backward by hand or in any other convenient way, whereby the spring-plungers may be drawn clear of engagement with the auger, thus allowing the auger to rotate about the drill-spindle.

In the devices shown in Figs. 10 and 11, T represents the hose or pipe for carrying the compressed air to the motor D, while T' represents the hose or pipe for carrying off the exhaust-air and supplying the same to the hollow drill-spindle A. This hose T' fits over the thimble $u$, attached to the sleeve U, which is revolubly held between the cap $a'$ on the inner end of the hollow drill-spindle and the collar $a^2$. The drill-spindle revolves within the sleeve U, and an opening between the said drill-spindle (not shown) admits the passage of the air from the motor D to the hollow drill-spindle A. Should it be desired to reverse the engine, the hose T' may be connected to the source of air-pressure, and the hose T may be connected to the thimble $u$, whereby the direction of the air passing through the motor D is reversed, and hence the motor is caused to move in the opposite direction. This motor is preferably that type of reversible rotary motor well known in the art and not specifically described herein.

The reamer-blades may be of any desired type and operated in any desired way. These reamer-blades are drawn in or forced out through the lateral slots $a^0$ in the hollow drill-head, and it will be evident that there may be one, two, or more of the said reamer-blades, as may be desired.

In Fig. 1 I have shown two reamer-blades K pivoted at $k$ in the drill-head and operated by the bifurcated arms $m$ on the end of the operating-rod M, which may be pushed forward or drawn backward in any convenient way.

When the machine is to be used as an auger, the feed-nut is clamped in place, as shown in dotted lines in Fig. 1, the reamer-arms are drawn in, the drill-spindle is revolved, and the air is blown in, causing the chips cut by the auger to be blown to the rear, out through the bore-hole.

Now when it is desired to use the machine as a reamer the feed-nut is released, as shown in full lines in Fig. 1, the reamer-blades are forced outward in the usual way, and the drill-spindle is caused to revolve in the opposite direction. The auger will bite into the mineral with sufficient force to prevent it from turning backward, and thus will serve as a centering device for the reamer, while the drill-spindle will rotate, pressing backward the spring-pawls and allowing it to move freely while the auger is fixed. At the same time the air is blown through the drill-spindle, and escaping through the aperture $a^2$ it blows back the chips and cuttings and carries them out of the bore-hole.

In the device shown in Figs. 6 and 7 the rod $q^4$ should be drawn to the rear until the ends of the spring-plungers no longer project beyond the ends $a^3$ of the drill-spindle.

Thus it will be seen that I provide a machine which can be used either as an auger or as a reamer without the necessity for withdrawing the same from the bore-hole and in which the air-pressure removes the chips or cuttings, leaving the bore-hole clear for the insertion of the explosive charge and of the tamping.

It will be obvious that various modifications of the herein-described apparatus might be made which could be used without departing from the spirit of my invention.

Having thus described my invention, what I claim, and desire to secure by Letters Patent of the United States, is—

1. In a mining-machine, the combination with a drill-spindle, and means for revolving the same in either direction, of an auger revolubly connected to said drill-spindle, and means for checking the rotation of said auger, relative to said drill-spindle, a detachable feed-nut adapted to engage said drill-spindle, when desired, and an extensible cutting-blade mounted in said drill-spindle with means for forcing the said blade outward, when desired, substantially as described.

2. In a mining-machine the combination with a drill-spindle, and means for revolving the same in either direction, of means for regulating the feed of said drill-spindle, an auger revolubly connected to said drill-spindle, and means for causing said auger to revolve with said drill-spindle in one direction only, and an extensible cutting-blade, or extensible cutting-blades, mounted in said drill-spindle, with means for forcing the said blade or blades outward, when desired, substantially as described.

3. In a mining-machine, the combination with a hollow drill-spindle, with apertures near the forward end thereof, to allow the escape of fluid therefrom, and means for revolving the said drill-spindle, of means for regulating the feed of said drill-spindle, an auger revolubly connected to said drill-spindle, and means for causing said auger to revolve with said drill-spindle or not, as desired, and an extensible cutting-blade, or extensible blades, mounted in said drill-spindle, with means for forcing the said blade or blades outward, when desired, substantially as described.

4. In a mining-machine, the combination with a hollow drill-spindle, with apertures near the forward end thereof, to allow the escape of fluid therefrom, and means for revolving the said drill-spindle in either direction, of means for regulating the feed of said drill-spindle, an auger revolubly connected to said drill-spindle, and means for causing said auger to revolve with said spindle in one direction only, and an extensible cutting-blade, or extensible cutting-blades, mounted in said drill-spindle, with means for forcing the said blade or blades outward, when desired, substantially as described.

5. In a mining-machine, the combination with a hollow drill-spindle, with apertures near the forward end thereof to allow the escape of fluid therefrom, and means for revolving the said drill-spindle, of means for regulating the feed of said drill-spindle, an auger revolubly connected to said drill-spindle, and spring-operated pawls adapted to cause the said auger to revolve with said drill-spindle in one direction only, substantially as described.

6. In a mining-machine, the combination with a hollow drill-spindle, with apertures near the forward end thereof, to allow the escape of fluid therefrom and means for revolving the said drill-spindle in either direction, of means for regulating the feed of said drill-spindle, an auger revolubly connected to said drill-spindle, spring-operated pawls adapted to cause the said auger to revolve with said drill-spindle in one direction only, and an extensible cutting-blade, or extensible cutting-blades, mounted in said drill-spindle, with means for forcing the said blade or blades, outward when desired, substantially as described.

In testimony whereof I affix my signature in presence of two witnesses.

ROBERT H. ELLIOTT.

Witnesses:
W. G. ROBINSON,
J. B. ROBINSON.